J. W. BEIGER.
METHOD OF AND APPARATUS FOR MOLDING WOODEN SHEETS.
APPLICATION FILED AUG. 20, 1919.
1,369,160.　Patented Feb. 22, 1921.
3 SHEETS—SHEET 1.
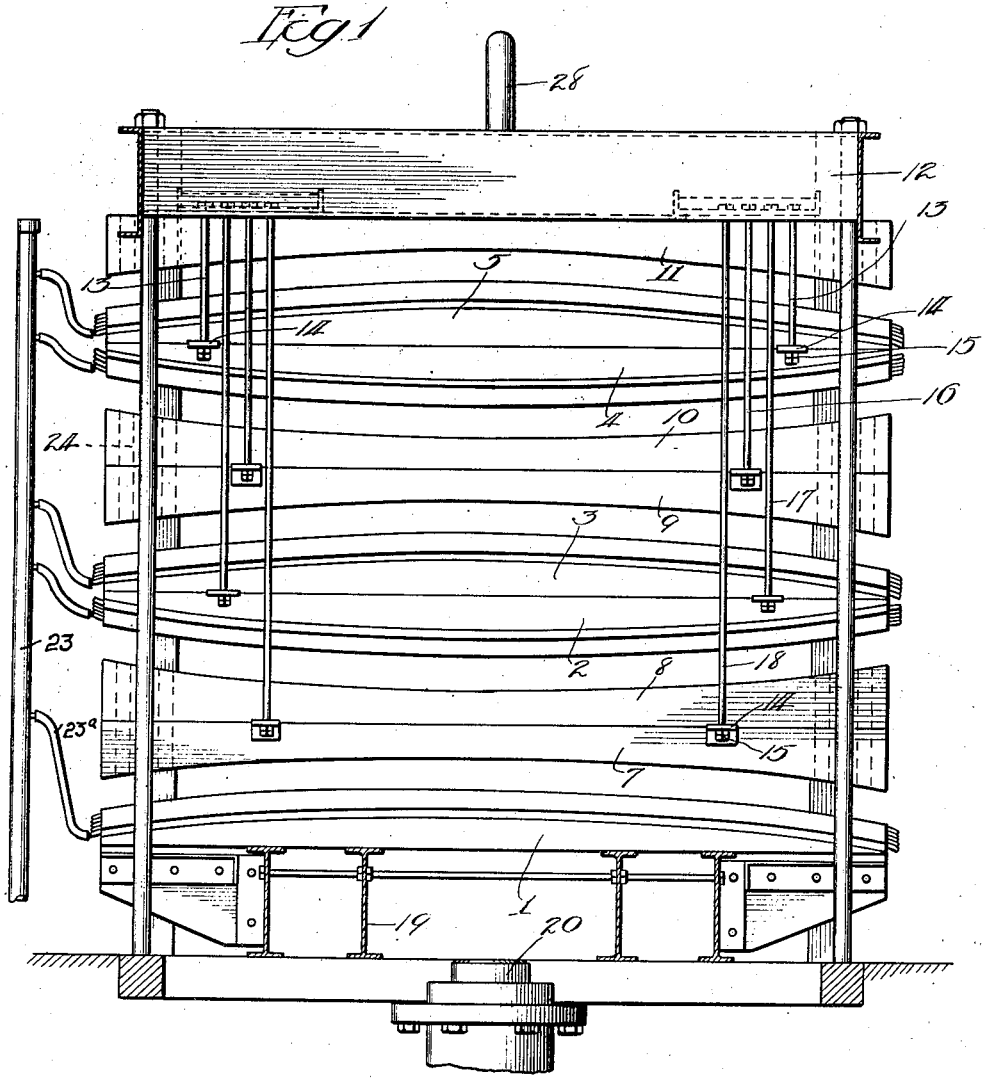
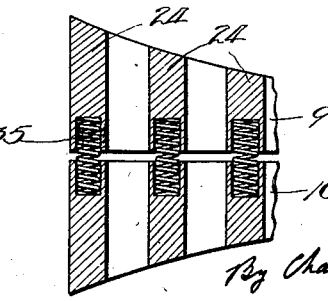

J. W. BEIGER.
METHOD OF AND APPARATUS FOR MOLDING WOODEN SHEETS.
APPLICATION FILED AUG. 20, 1919.
1,369,160. Patented Feb. 22, 1921.
3 SHEETS—SHEET 2.
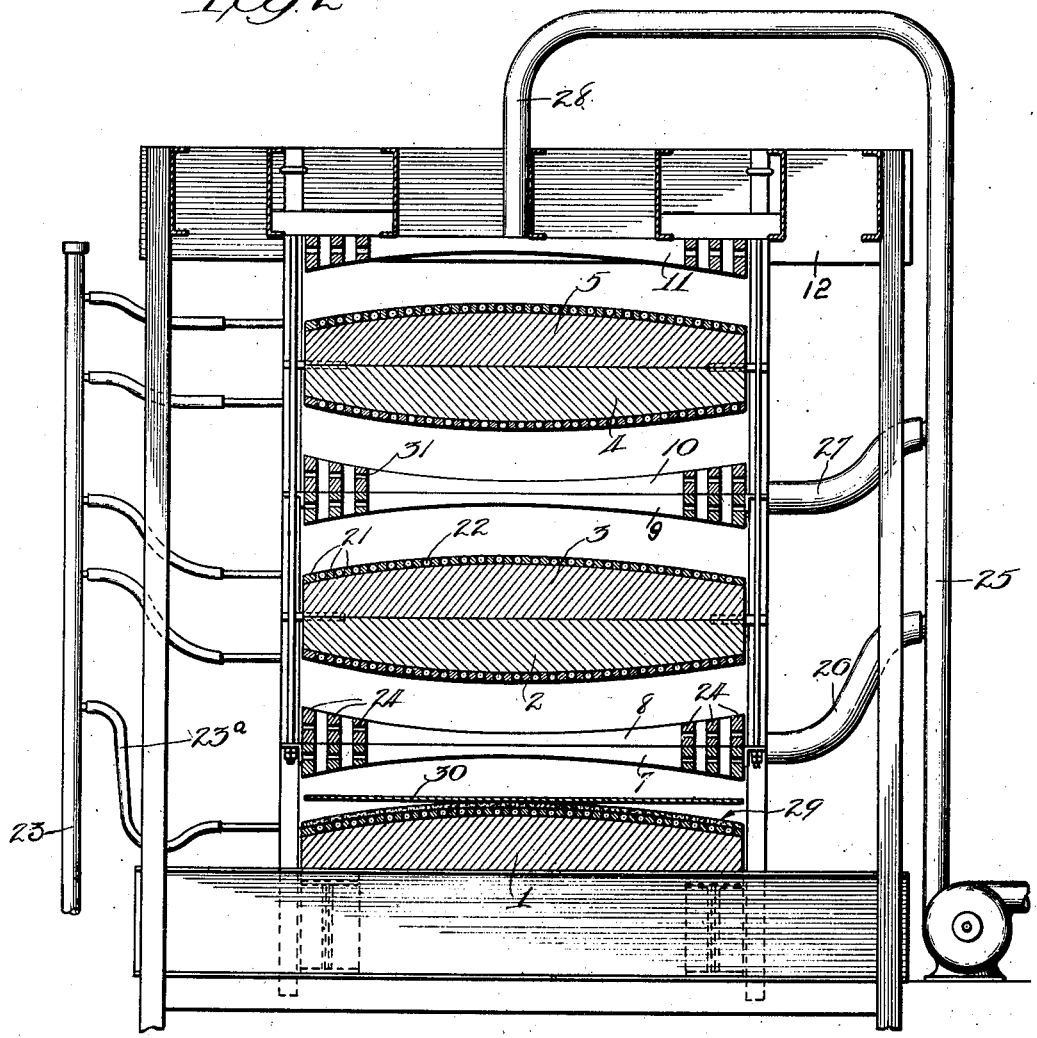
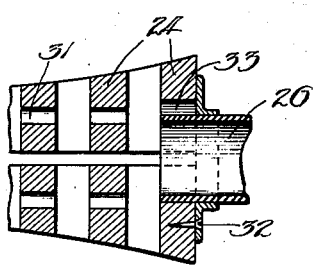

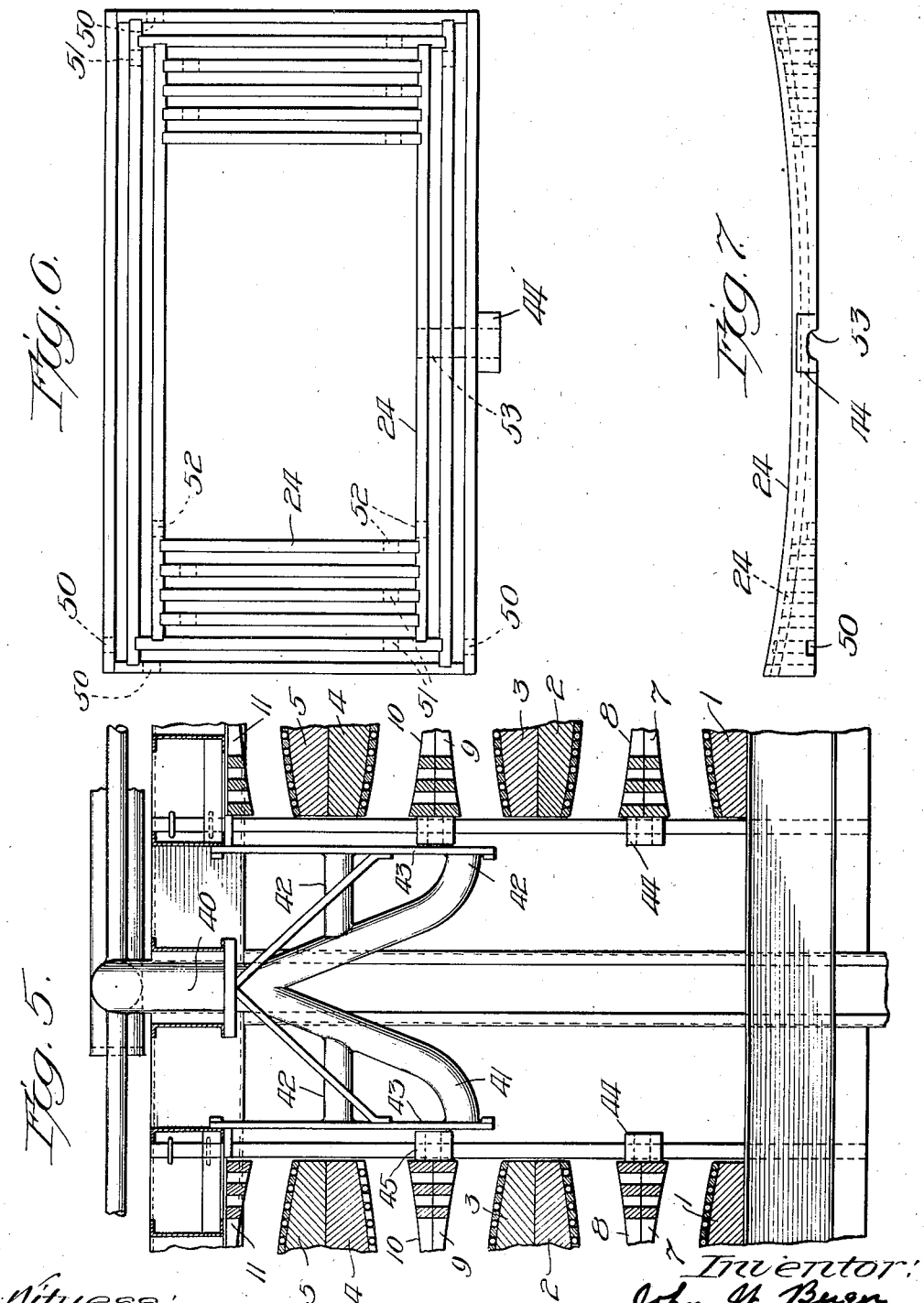

UNITED STATES PATENT OFFICE.

JOHN WALTER BEIGER, OF GRAND RAPIDS, MICHIGAN, ASSIGNOR TO HASKELITE MANUFACTURING CORPORATION, A CORPORATION OF NEW YORK.

METHOD OF AND APPARATUS FOR MOLDING WOODEN SHEETS.

1,369,160.  Specification of Letters Patent.  Patented Feb. 22, 1921.

Application filed August 20, 1919. Serial No. 318,646.

*To all whom it may concern:*

Be it known that I, JOHN W. BEIGER, a citizen of the United States, residing at Grand Rapids, county of Kent, State of Michigan, have invented a certain new and useful Improvement in Methods of and Apparatus for Molding Wooden Sheets, and declare the following to be a full, clear, and exact description of the same, such as will enable others skilled in the art to which it pertains to make and use the same, reference being had to the accompanying drawings, which form a part of this specification.

In an application filed jointly by myself and Henry L. Haskell on May 17, 1918, Serial No. 235,119, there is disclosed a method of and apparatus for molding sheets of laminated wood so as to give them a curvature in two planes transverse to each other. The present invention relates to the same problem as that in the aforesaid application, but more particularly to the molding of sheets where only a comparatively slight degree of curvature is required and it has for its object to produce a simple and novel process and apparatus whereby sheets of laminated wood may be molded without producing any roughness or raising of the grain on one side of the sheet which is adapted to receive a finish and be exposed when used.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an end elevation of a machine arranged in acordance with the present invention;

Fig. 2 is a transverse section through the machine;

Fig. 3 is a sectional view on an enlarged scale through a fragment of one of the die members, illustrating the connection therewith of an air circulating conduit;

Fig. 4 is a sectional view similar to Fig. 3, illustrating a compensating cushion for equalizing the pressure on the work in the machine;

Fig. 5 is a vertical transverse section through the adjacent ends of a double machine slightly different in detail from that illustrated in Figs. 1 and 2; and Fig. 6 is a top plan view and Fig. 7 a side elevation of one of the female die members of the machine illustrated in Fig. 5.

Referring to Figs. 1–4 of the drawings, 1, 2, 3, 4 and 5 represent the male die members while 7, 8, 9, 10 and 11 represent the female die members of a series of dies arranged in a group in a single press. For the purpose of saving space, all of the die members except the two extreme members, are arranged in pairs, back to back. The working faces of the die members are given the contour which is to be impressed upon the sheets which are to be molded into shape. The particular machine illustrated is one adapted to mold large sheets into the shape required for the top or roof of closed automobiles and therefore the dies are approximately rectangular in cross section, the female members being slightly dished, and the male members being slightly convex to fit into the dished members.

The several die members are arranged one above the other in a suitable skeleton frame structure, 12, which is made high enough to permit the two members of each die to separate from each other far enough to permit the work to be readily placed in and taken out of the machine. In the arrangement shown, the die member 11 is the uppermost member of the group and it is mounted so as to be stationary. The members 4 and 5 are connected together so as to move as one piece and are hung from rods, 13, secured at their upper ends to the top of the frame and extending through ears, 14, projecting laterally from the die members; there being nuts or other shoulders, 15, on the lower ends of the rods to limit the downward movement of the die members. The parts are so proportioned that when free to do so, the die members 4 and 5 drop down until they are supported from the nuts or shoulders on the lower ends of the rods; sufficient space being thereby left between the die member 5 and the coöperating die member 11 to permit the insertion and removal of the work. It will of course be understood that the members 4 and 5 need not be fastened together, because the ears 14 may be attached to the lower of the two die members, so that the upper member of the two will be supported by simply resting thereon.

In the same way the pairs of die members 9 and 10, 2 and 3, and 7 and 8 are supported from rods, 16, 17 and 18, respectively; the rods becoming progressively longer, but all passing through ears, 14, and having nuts or shoulders, 15, on their lower ends. The lowermost die member, 1, is mounted on a strong platform, 19, which may be raised by a hydraulic plunger, 20, or other suitable means. The parts are so proportioned that when the lifting means, 20, is retracted, all of the dies will be opened in the same way as explained in connection with the die consisting of the members 5 and 11.

The dies may be constructed in various ways, depending upon the results to be accomplished. In the arrangement shown, each male die is made up of a solid block or body which may conveniently be formed out of wood but may of course be made of any other suitable material such as concrete, for example. Where wood is employed, the working face of each male die member may be given the proper contour and it may then be covered with a layer of bars or slats, 21, spaced apart far enough to provide seats or pockets for receiving steam pipes, 22, and having a thickness equal to the diameter of the steam pipes so that the nested slats and pipes form a comparatively smooth continuous surface. Steam is supplied to the pipes through a main supply pipe, 23, having branches, 23ᵃ, each leading to the steam pipes in one of the dies.

The female die members are preferably made in the form of spiders or open-work; it being sufficient that they engage the work in the vicinity of the edges, the center being left free. In the arrangement shown, each of these die members is in the form of a rectangular frame, each member of which is composed of three planks or heavy boards, 24, set on edge and spaced a short distance apart from each other. Some means is preferably provided for permitting the entry of air through the female dies over the upper surfaces of the work. In the arrangement shown, there is an air pipe, 25, having branches, 26 and 27, each leading to one of the pairs of female dies, and a third branch, 28, terminating at the center of the uppermost die member 11. Air may be blown or drawn through the pipe 25, so that in either case there will be maintained an air current passing across one surface of each sheet of work in the machine.

In using the machine a blanket, such as indicated at 29, is placed on each of the male dies, over the steam pipes, each of the blankets being moistened in any suitable way. If the blankets are loose, that is not permanently attached to the dies, they may be moistened by simply dipping them into water and then wringing them partially dry. The sheets to be molded into shape are then placed between the dies in the manner of the sheet shown at 30 in Fig. 2. If loose blankets are employed, the sheet which is to be molded between the die members 2 and 8 must be laid on the female member of the die with the blanket overlying it. However, when the dies are closed there will be between each sheet and one of the die members containing the steam pipes a moist blanket, while the other side of the sheet will be exposed to circulating air. The closing of the dies presses the sheets into the desired shape, the steam from the heated blankets permeates the wood, and finally the wood will be given a "set" which will prevent the sheets from flattening out when they are removed from the dies. The circulating air keeps one surface of each sheet dry so that this surface will not have to be sanded or otherwise smoothed after the molding operation; but it will come out of the machine in the same condition in which it went in. The sheets themselves may of course be boiled as described in the aforesaid application of myself and Henry L. Haskell, but where this is done, each sheet will have both surfaces left in a more or less rough condition, necessitating sanding or otherwise smoothing before it is ready to receive paint. This objection to preliminary boiling may be avoided by placing the material into the dies directly from the press in which they have been manufactured; but it has been found that there is usually not enough moisture in such sheets to insure that they will retain their shape after leaving the dies, unless a wet blanket or similar expedient is adopted.

In order to insure that air may circulate freely across all portions of one face of each sheet, the joints between the contacting female die members may be so constructed as to leave spaces open to the outside atmosphere, or else the beams or blanks 24 may be perforated at intervals indicated at 31.

The air circulating pipes may be connected to the die members in any suitable way. Thus, as shown in Fig. 3, the air pipe, 26, may simply be carried through the outermost of the beams 24 on the side of the die at which the air pipe happens to be located. If the members of each group of two female die members are spaced apart from each other, as they will be if provided with equalizing cushions as hereinafter explained, the air pipe may be permanently fastened to one of the two members indicated at 32, while the opening, 33, in the other of the two members through which the pipe extends is made large enough to afford the necessary clearance during equalizing movements.

If desired, cushioning means may be inserted at intervals in the series of die members so as to permit an equalization of pressure throughout the entire machine. This may conveniently be accomplished by placing strong coiled springs, such as indicated at 35 in Fig. 4, between the pairs of female dies; the springs tending constantly to spread the two die members apart and being powerful enough to exert an equalizing influence on the pressure which is exerted by the power devices for clamping the jaws shut.

In the arrangement shown in Fig. 5, the main features of the machine heretofore described are shown as embodied in a double machine. Instead of placing flexible connections between the air circulating pipes and the movable die members to be ventilated, the main air conduit, 40, may be provided with branches, 41 and 42, which terminate in the faces of vertical plates, 43, each of which lies adjacent to the side of one of the two machines, if the machines are grouped in units of two as illustrated in Fig. 5. Associated with each of the two groups of die members, 7, 8, and 9, 10, is a tubular projection, as indicated at 44 and 45, respectively. The parts are so arranged that when the dies are closed, the member 44 comes opposite the open end of the corresponding branch, 41, of the circulating pipe conduit while the member 45 comes opposite the open end of the branch 42; the members 44 and 45 lying close enough to the corresponding plate, 43, to insure a flow of air through the members 44 and 45.

Furthermore, instead of indiscriminately perforating the planks or boards, 24, of which the female die members are composed, there may be an opening, as indicated at 50, through each of the outermost of the members 24, and other openings such as indicated at 51 and 52, through the remainder of the members 24 such that air drawn in through the openings, 50, must move in a circuitous path and finally reach the central open space in the die member. The passage or opening in the member 44, (or the member 45) may be connected by a conduit, 53, to the central open space in the die. Consequently, if the circulation is produced by suction, the outside air will be drawn in and caused to flow around the marginal portions of the work in a pair of dies, finally entering the open central space and then being drawn out through the conduit 53.

While my invention is particularly applicable to the molding of laminated wood veneer known as "Haskelite," it is also useful for wooden sheets of other kinds. Furthermore, while I have illustrated only a single form of machine or apparatus for carrying out my invention, I do not desire to be limited to the details thus illustrated and described; but intend to cover all forms and arrangements which come within the terms employed in the definitions of my invention constituting the appended claims.

I claim:

1. The method of molding a wooden sheet which consists in subjecting it to heat and pressure while at the same time applying moisture to one side thereof and keeping the other side dry.

2. The method of molding a wooden sheet which consists in placing it under pressure while applying heat and moisture to one face and simultaneously producing a flow of air across the opposite face.

3. The method of molding a wooden sheet which consists in pressing it between dies one of which is heated and the other cool in the presence of moisture on the side next to the heated die.

4. The method of molding a wooden sheet which consists in pressing it between dies with a moist pad lying between the sheet and one of the dies, the latter die being kept hot and a circulation of air being maintained across the face of the sheet next to the other die.

5. A machine of the character described comprising two die members, means for heating one of said members, means for producing a circulation of air across that side of the work next to the other die member, and means for pressing said die members together.

6. A machine of the character described comprising two die members, means for heating one of said members, means for producing a circulation of air across that side of the work next to the other die member, a blanket or pad adapted to overlie the heated die member for the purpose of containing moisture to be delivered to work in the dies, and means for pressing said die members together.

7. A machine of the character described, comprising a series of pairs of die members arranged one above the other, spring cushioning and pressure equalizing means arranged between certain of the die members, and means for simultaneously pressing all of the die members together.

In testimony whereof, I sign this specification.

JOHN WALTER BEIGER.